United States Patent
Shin et al.

(10) Patent No.: US 12,524,656 B2
(45) Date of Patent: Jan. 13, 2026

(54) DEPTHWISE-CONVOLUTION IMPLEMENTATION ON A NEURAL PROCESSING CORE

(71) Applicant: Samsung Electronics Co., Ltd., Suwon-si (KR)

(72) Inventors: Jong Hoon Shin, San Jose, CA (US); Ali Shafiee Ardestani, Santa Clara, CA (US); Joseph H. Hassoun, Los Gatos, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 1159 days.

(21) Appl. No.: 17/401,298

(22) Filed: Aug. 12, 2021

(65) Prior Publication Data
US 2022/0405558 A1    Dec. 22, 2022

Related U.S. Application Data

(60) Provisional application No. 63/213,685, filed on Jun. 22, 2021.

(51) Int. Cl.
G06N 3/063    (2023.01)
G06F 15/80    (2006.01)

(52) U.S. Cl.
CPC ......... *G06N 3/063* (2013.01); *G06F 15/8061* (2013.01); *G06F 15/8092* (2013.01)

(58) Field of Classification Search
CPC . G06F 15/8061; G06F 15/8092; G06N 3/045; G06N 3/063
See application file for complete search history.

(56) References Cited

U.S. PATENT DOCUMENTS

| 9,836,691 B1 | 12/2017 | Narayanaswami et al. |
| 10,366,302 B2 | 7/2019 | Yang et al. |

(Continued)

FOREIGN PATENT DOCUMENTS

| CN | 111832716 A | 10/2020 |
| CN | 111931927 A | 11/2020 |

(Continued)

OTHER PUBLICATIONS

Khatwani et al. "A Flexible Multichannel EEG Artifact Identification Processor using Depthwise-Separable Convolutional Neural Networks", Apr. 2021, ACM Journal on Emerging Technologies in Computing Systems, vol. 17, No. 2, Article 23, pp. 1-21. (Year: 2021).*

(Continued)

*Primary Examiner* — Brent Johnston Hoover
(74) *Attorney, Agent, or Firm* — Renaissance IP Law Group LLP

(57) ABSTRACT

A core of neural processing units is configured to efficiently process a depthwise convolution by maximizing spatial feature-map locality using adder trees. Data paths of activations and weights are inverted, and 2-to-1 multiplexers are every 2/9 multipliers along a row of multipliers. During a depthwise convolution operation, the core is operated using a RSxHW dataflow to maximize the locality of feature maps. For a normal convolution operation, the data paths of activations and weights may be configured for a normal convolution configuration and in which multiplexers are idle.

18 Claims, 14 Drawing Sheets

(56) References Cited

U.S. PATENT DOCUMENTS

| | | | |
|---|---|---|---|
| 10,528,864 | B2 | 1/2020 | Dally et al. |
| 2019/0147324 | A1 | 5/2019 | Martin |
| 2019/0392287 | A1 | 12/2019 | Ovsiannikov et al. |
| 2020/0034148 | A1 | 1/2020 | Sumbul et al. |
| 2020/0082242 | A1 | 3/2020 | Jin et al. |
| 2020/0082246 | A1 | 3/2020 | Shao et al. |
| 2020/0293867 | A1 | 9/2020 | Shao et al. |
| 2020/0301994 | A1 | 9/2020 | Dikici et al. |
| 2020/0310758 | A1* | 10/2020 | Desoli .................. G06N 3/063 |
| 2020/0349420 | A1 | 11/2020 | Ovsiannikov et al. |
| 2021/0012186 | A1 | 1/2021 | Venkatesh et al. |

FOREIGN PATENT DOCUMENTS

| | | |
|---|---|---|
| GB | 2568102 A | 5/2019 |
| KR | 101989793 B1 | 6/2019 |
| WO | 2019216513 A1 | 11/2019 |

OTHER PUBLICATIONS

European Extended Search Report for Application No. 22169913.5, mailed Oct. 27, 2022.

Gheysen, Guillaume et al., "Accelerating Convolutional Neural Networks for FPGA using Depthwise Separable Convolution and Pruning," DIAL Digital Access to Libraries, 2020, 112 pages.

Li, Baoting et al., "Dynamic Dataflow Scheduling and Computation Mapping Techniques for Efficient Depthwise Separable Convolution Acceleration," IEEE Transactions on Circuits and Systems—I: Regular Papers, IEEE, vol. 68, No. 8, 2021, pp. 3279-3292.

Liu, Liu et al., "Duet: Boosting Deep Neural Network Efficiency on Dual-Module Architecture," 2020 53rd Annual IEEE/ACM International Symposium on Microarchitecture (Micro), 2020, 13 pages.

Udupa, Pramod et al., "Accelerating Depthwise Convolution and Pooling Operations on z-First Storage CNN Architectures," 2020 IEEE International Symposium on Circuits and Systems (ISCAS), IEEE, 2020, 5 pages.

* cited by examiner

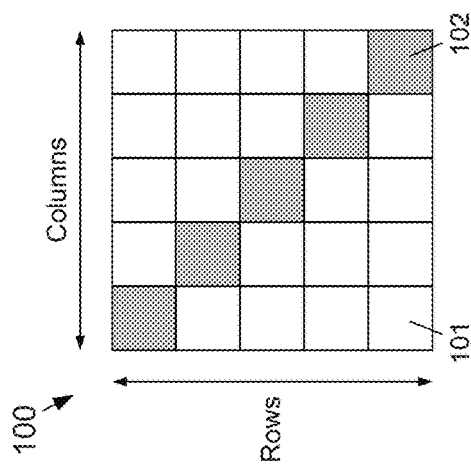
FIG. 1
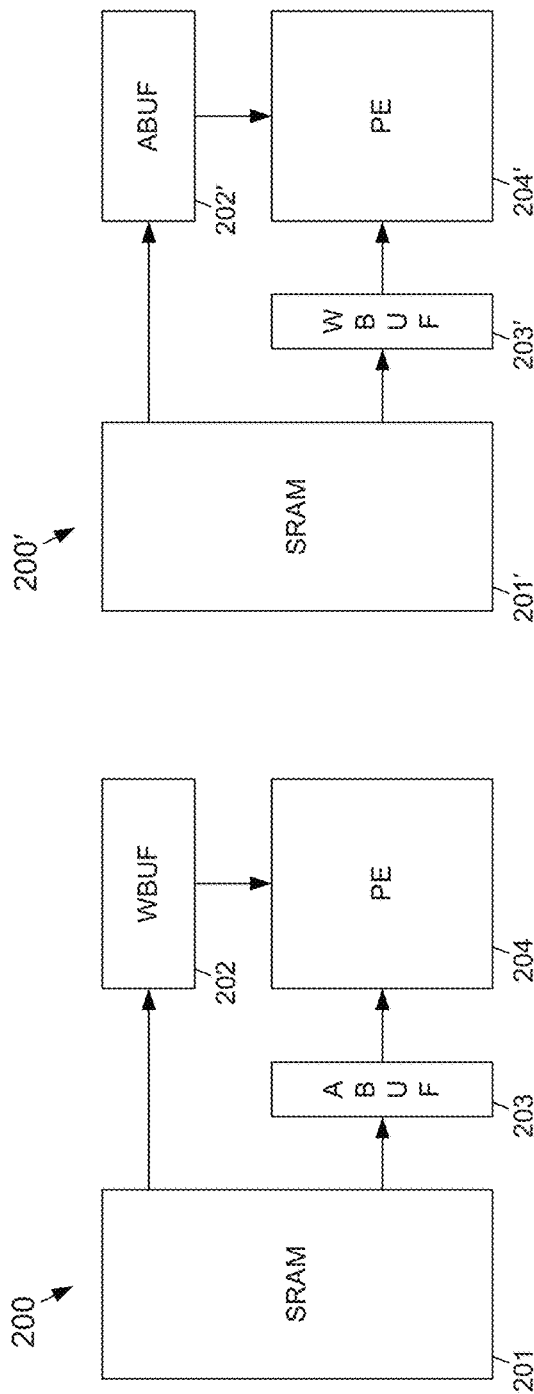
FIG. 2A
FIG. 2B

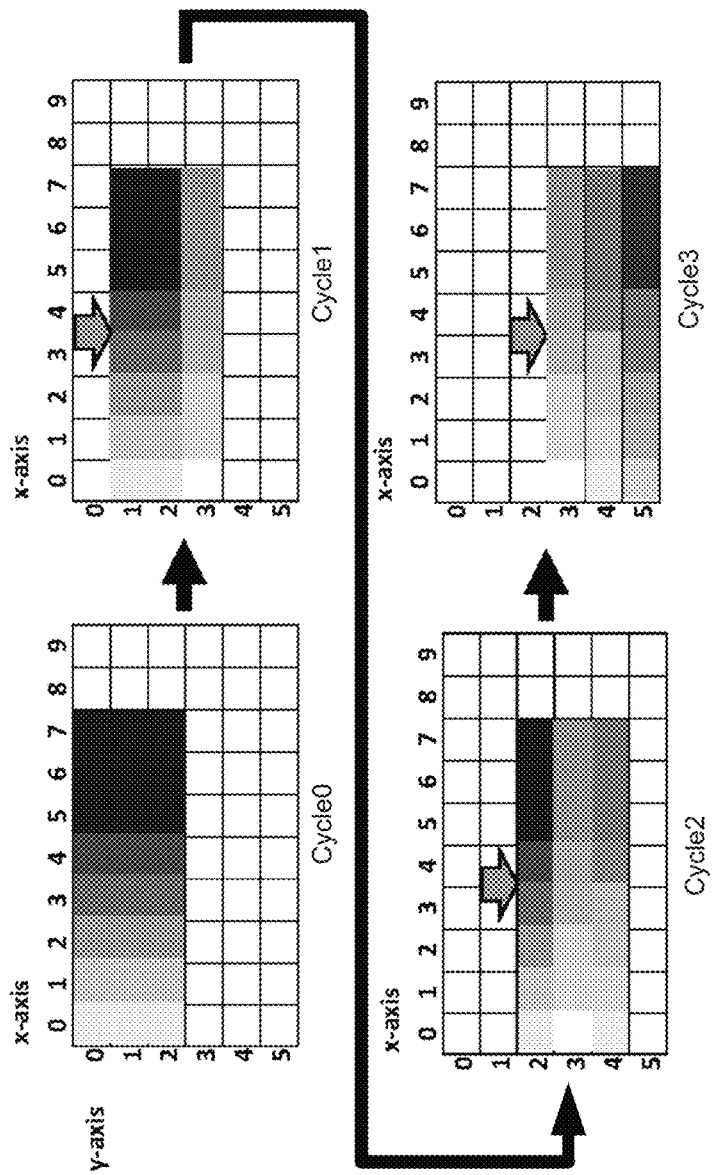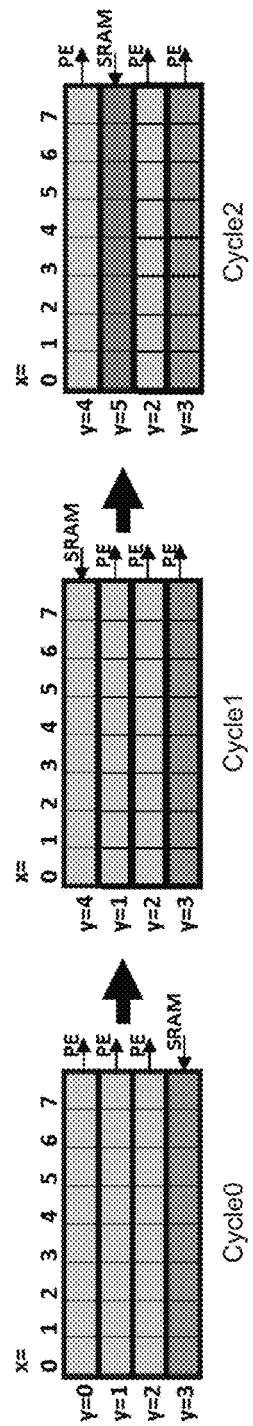
FIG. 6B
FIG. 6C

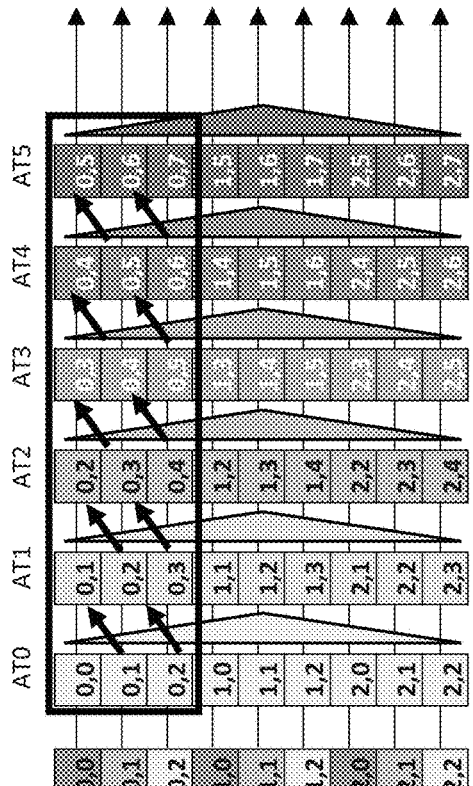
FIG. 7A
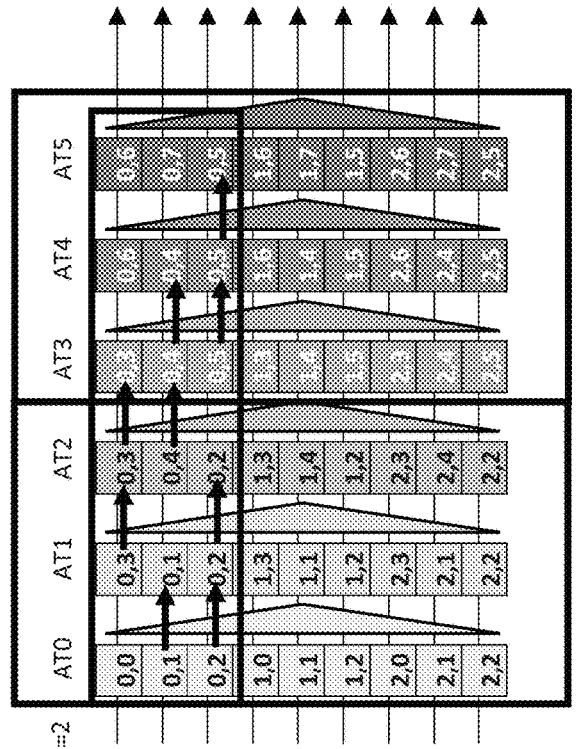
FIG. 7B
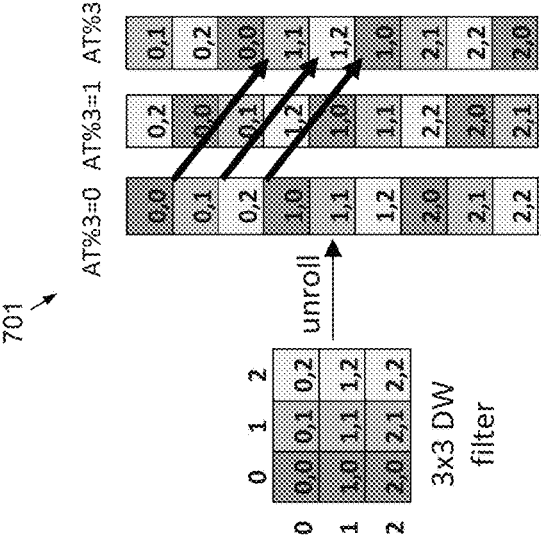

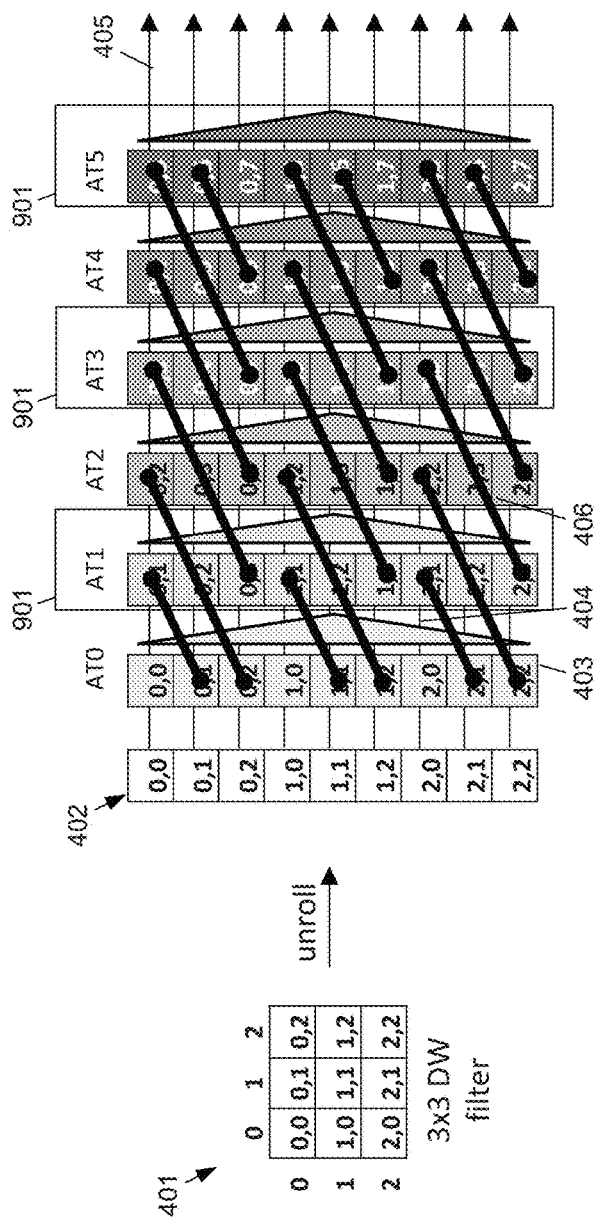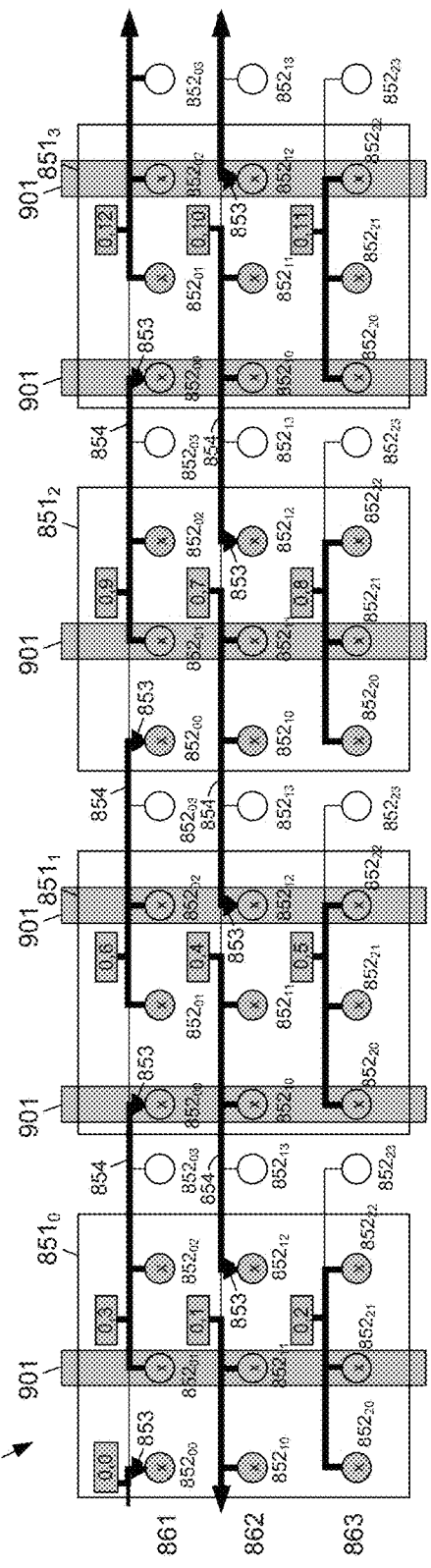
FIG. 9A
FIG. 9B

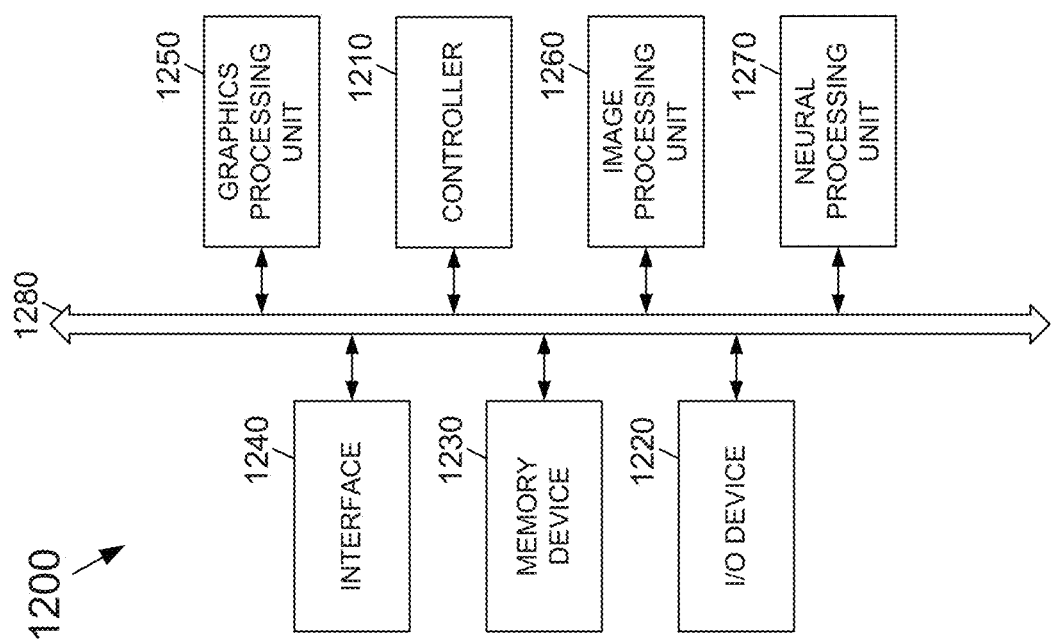

DEPTHWISE-CONVOLUTION IMPLEMENTATION ON A NEURAL PROCESSING CORE

CROSS-REFERENCE TO RELATED APPLICATION

This application claims the priority benefit under 35 U.S.C. § 119(e) of U.S. Provisional Application No. 63/213,685, filed on Jun. 22, 2021, the disclosure of which is incorporated herein by reference in its entirety.

TECHNICAL FIELD

The subject matter disclosed herein relates to neural processing units (NPUs). More particularly, the subject matter disclosed herein relates to a system and a method for configuring an array of NPUs for performing a depthwise convolution the in which the NPUs are configured to maximize spatial feature-map locality using adder trees.

BACKGROUND

Conventional neural processing units (NPUs) are optimally designed for a normal convolution operation. Depthwise (DW) convolution operations, however, exhibit a low NPU utilization rate when executed on NPUs configured for a normal convolution operation.

Conventional NPU cores have been optimally designed for a normal convolution operation to have an input channel (C) and an output channel (K) unrolled in space. Parallelized input channels are reduced using a combination of adders and accumulators. A depthwise convolution operation may omit a number of suboperations that may be associated with a normal convolution operation. While a normal convolution operation performs a dot-product of activation tensors and weight tensors along an input channel direction (the C-axis), a depthwise convolution does not reduce the products in an input channel direction. Instead, each input channel of activation tensor has a corresponding weight filter with depth of 1, is convolved with pixels in the weight filter, and then reduced. Since MobileNet-type architectures have been introduced (which focus on depthwise convolutions), numerous deep-learning architectures have included a depthwise convolution operation that reflects an increasing demand for depthwise convolution using NPU cores.

A traditional approach to solving low-utilization of conventional NPUs for a depthwise convolution is by using a dedicated vector processor that is attached to the NPU core. This approach, however, may not work well for a 5×5 filter due to a load imbalance between the NPU core and the vector processor. And, during normal convolution operations, the vector processor remains idle, thereby making a NPU/vector processor chip inefficient.

SUMMARY

An example embodiment provides a core of NPUs that may include a first memory, a second memory and an array of NPUs. The first memory may store first values. The second memory may store second values. The array of NPUs may be arranged in C rows and K columns in which C and K may be integers that are both divisible by 4, each NPU may include 4×4 processing elements (PEs) arranged in 4 rows and 4 columns, and each PE may include a first input and a second input. In a first operational mode of the core of NPUs, the core of NPUs may be configured as Int(C/3) row groups (RGs) in which each row group may include: three consecutively adjacent rows $RG_1$-$RG_3$ of PEs, a first row $RG_1$ may include a 2-to-1 multiplexer having an output coupled to the first input of a $PE_{11}$ in each $k^{th}$ NPU for k=1 to K, each 2-to-1 multiplexer including a first input and a second input, for k=1, the first input to the 2-to-1 multiplier may be coupled to the first memory, for k=1 to K−1, the first input of each $PE_{12}$-$PE_{14}$ in each $k^{th}$ NPU may be coupled to the second input of the 2-to-1 multiplexer coupled to $PE_{11}$ in the $k^{th}$ NPU, to the first input of the 2-to-1 multiplexer coupled to $PE_{11}$ in a $(k+1)^{th}$ NPU, and to the first memory, a second row $RG_2$ may include a 2-to-1 multiplexer having an output coupled to the first input of $PE_{23}$ in each $k^{th}$ NPU for k=1 to K, for k=1, the first input of $PE_{21}$ and $PE_{22}$ in the $k^{th}$ NPU may be coupled to the first input of the 2-to-1 multiplexer coupled to $PE_{23}$ in the $k^{th}$ NPU and to the first memory, for k=2 to K−1, the first input of $PE_{21}$ and $PE_{22}$ in each $k^{th}$ NPU may be coupled to the second input of the 2-to-1 multiplexer coupled to the $PE_{23}$ in the $(k-1)^{th}$ NPU, to the first input of $PE_{24}$ in the $(k-1)^{th}$ NPU, to the first input of the 2-to-1 multiplexer coupled to the $PE_{23}$ in the $k^{th}$ NPU, and to the first memory, a third row $RG_3$ may include the first input of each of $PE_{31}$-$PE_{34}$ may be coupled to the first input of each other $PE_{31}$-$PE_{34}$ of the $k^{th}$ NPU and to the first memory, and the second input of each PE in a column of PEs may be coupled to the second memory. In one embodiment, $PE_{14}$, $PE_{24}$, $PE_{34}$ and $PE_{44}$ of each NPU are disabled in the first operational mode. In another embodiment, for k=odd, $PE_{12}$, $PE_{22}$, $PE_{32}$ and $PE_{42}$ of each row of NPUs may be disabled, and for k=even, $PE_{11}$, $PE_{12}$, $PE_{13}$, $PE_{14}$, $PE_{13}$, $PE_{23}$, $PE_{33}$ and $PE_{43}$ of each row of NPUs may be disabled in the first operating mode. In still another embodiment, the second values stored in the second memory may include values for a 5×5 filter. In yet another embodiment, in a second operational mode the core of NPUs may be configured as: for k=1 to K, each row of PEs may include the first input of each of $PE_{31}$-$PE_{34}$ being coupled to the first input of each other $PE_{31}$-$PE_{34}$ of the $k^{th}$ NPU and to the first memory; and the second input of each PE in a column of PEs being coupled to the second memory. In one embodiment, the core of NPUs may generate a convolution result from the first values and the second values in the second operational mode. In another embodiment, the core of NPUs may generate a depthwise convolution result from the first values and the second values in the first operational mode. In still another embodiment, the first memory stores activation values and the second memory stores weight values. In yet another embodiment, the second values stored in the second memory may include values for a 3×3 filter.

An example embodiment provides a method to configure a core of NPUs, the core of NPUs may include an array of NPUs arranged in C rows and K columns in which C and K may be integers that are both divisible by 4, each NPU may include 4×4 processing elements (PEs) arranged in 4 rows and 4 columns, each PE comprising a first input and a second input, the method may include: for a first operational mode, configuring the core of NPUs to generate a depthwise convolution result from first values and second values by configuring the core of NPUs into Int(C/3) row groups (RGs), each row group may include three consecutively adjacent rows $RG_1$-$RG_3$ of PEs; configuring a first row $RG_1$ so that a 2-to-1 multiplexer has an output coupled to the first input of a $PE_{11}$ in each $k^{th}$ NPU for k=1 to K, each 2-to-1 multiplexer may include a first input and a second input, for k=1, configuring the first input to the 2-to-1 multiplier to be coupled to a first memory that stores the first values, and for k=1 to K−1, configuring the first input of each $PE_{12}$-$PE_{14}$ in each $k^{th}$ NPU to be coupled to the second input of the 2-to-1 multiplexer that is coupled to $PE_{11}$ in the $k^{th}$ NPU, to be coupled to the first input of the 2-to-1 multiplexer coupled to $PE_{11}$ in a $(k+1)^{th}$ NPU, and to be coupled to the first memory; configuring a second row $RG_2$ so that a 2-to-1 multiplexer has an output coupled to the first input of $PE_{23}$ in each $k^{th}$ NPU for k=1 to K, for k=1, configuring the first input of $PE_{21}$ and $PE_{22}$ in the $k^{th}$ NPU to be coupled to the first input of the 2-to-1 multiplexer coupled to $PE_{23}$ in the $k^{th}$ NPU and to be coupled to the first memory, for k=2 to K−1, configuring the first input of $PE_{21}$ and $PE_{22}$ in each $k^{th}$ NPU to be coupled to the second input of the 2-to-1 multiplexer coupled to $PE_{23}$ in the $(k-1)^{th}$ NPU, to be coupled to the first input of $PE_{24}$ in the $(k-1)^{th}$ NPU, to be coupled to the first input of the 2-to-1 multiplexer coupled to $PE_{23}$ in the $k^{th}$ NPU, and to be coupled to the first memory, configuring a third row $RG_3$ so that the first input of each of $PE_{31}$-$PE_{34}$ is coupled to the first input of each other $PE_{31}$-$PE_{34}$ of the $k^{th}$ NPU and is coupled to the first memory, and configuring the second input of each PE in a column of PEs to be coupled to a second memory that stores the second values. In one embodiment, the method may further include configuring $PE_{14}$, $PE_{24}$, $PE_{34}$ and $PE_{44}$ of each NPU to be disabled in the first operational mode. In another embodiment, the method may further include for k=odd, configuring $PE_{12}$, $PE_{22}$, $PE_{32}$ and $PE_{42}$ of each row of NPUs to be disabled, and for k=even, configuring $PE_{11}$, $PE_{12}$, $PE_{13}$, $PE_{14}$, $PE_{13}$, $PE_{23}$, $PE_{33}$ and $PE_{43}$ of each row of NPUs to be disabled in the first operating mode. In still another embodiment, the second values stored in the second memory may include values for a 5×5 filter. In yet another embodiment, the method may further include configuring the core of NPUs in a second operational mode by: for k=1 to K, configuring each row of PEs so that the first input of each of $PE_{31}$-$PE_{34}$ may be coupled to the first input of each other $PE_{31}$-$PE_{34}$ of the $k^{th}$ NPU and to the first memory; and configuring the second input of each PE in a column of PEs to be coupled to the second memory. In one embodiment, the method may further include generating by the core of NPUs a convolution result from the first values and the second values in the second operational mode. In another embodiment, the method may further include generating by the core of NPUs a depthwise convolution result from the first values and the second values in the first operational mode. In still another embodiment, the first memory may store activation values and the second memory may store weight values. In one embodiment, the second values stored in the second memory may include values for a 3×3 filter.

BRIEF DESCRIPTION OF THE DRAWING

In the following section, the aspects of the subject matter disclosed herein will be described with reference to exemplary embodiments illustrated in the figures, in which:

FIG. 1 depicts an array of multipliers in an example NPU core that has been conventionally configured for normal convolution operations;

FIG. 2A depicts a block diagram of a NPU that has been configured for a conventional convolution operation;

FIG. 2B depicts a modified NPU that improves activation bandwidth for depthwise convolution operations as compared to the activation bandwidth provided by the NPU in FIG. 2A;

FIG. 6B depicts an example 3×3 filter being shifted downward with respect to the activation values for four cycles according to the subject matter disclosed herein;

FIG. 6C depicts how activation values are sent to the multipliers using a four-row activation buffer as a line buffer according to the subject matter disclosed herein;

FIGS. 7A and 7B conceptually show that the diagonal mapping may be implemented as horizontal broadcasting by rotating weight values in the weight vector according to the subject matter disclosed herein;

FIG. 9A shows a logical mapping of how a 3×3 filter of weights with a stride of 2 is broadcast to the multipliers for a single example cycle to maximize spatial feature map locality according to the subject matter disclosed herein;

FIG. 9B corresponds to FIG. 9A and indicates columns of multipliers (adders not shown) that may be disabled for a 3×3 filter with a stride of 2;

FIG. 12 depicts an electronic device that includes a neural processing unit that has been configured to maximize spatial feature-map locality using adder trees according to the subject matter disclosed herein.

DETAILED DESCRIPTION

Figure 3A:
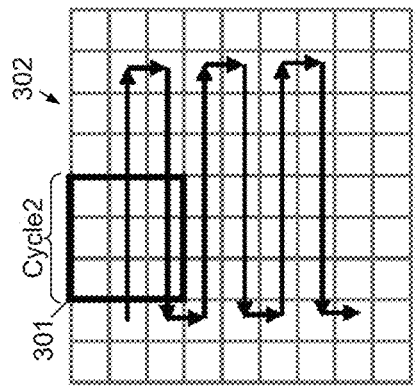
FIG. 3A depicts a characteristic of a depthwise convolution operation performed by a conventional NPU having data paths switched for activations and for weights.
Figure 3A:
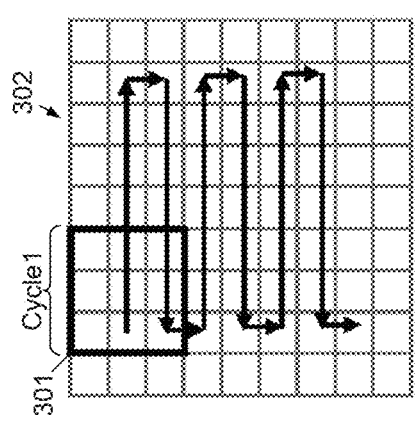
Figure 3A:
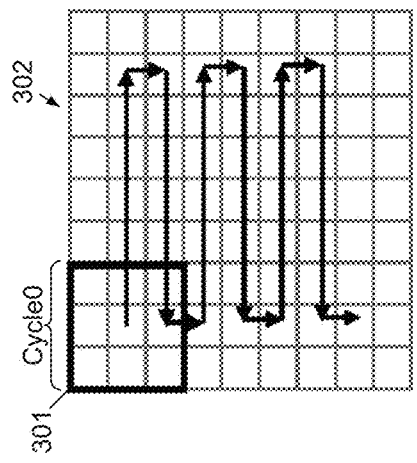

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system-on-a-chip (SoC), an assembly, and so forth.

The subject matter disclosed herein relates to NPUs that include their own SRAM, connecting the SRAM of different NPUs to other NPUs in vertical/horizontal/diagonal directions, and using the connections to support different NPU configurations having different input-channels and output channels and having spatial-reuse of SRAM data paths.

The subject matter disclosed herein inverts (switches) the data paths of activations and weights, adds a 2-to-1 multiplexers (MUXs) for every 2/9 multipliers, and runs a NPU core using a rows×columns and cells (RS×HW) for a depthwise convolution. For a normal convolution, the data paths of activations and weights may be configured for a normal convolution configuration with the 2-to-1 MUXs being idle. By changing dataflow of an NPU to be a RS×HW dataflow, NPU utilization for a depthwise convolution for a 3×3 filter and for a 5×5 filter may be respectively improved by ~9 times and ~25 times.

In one embodiment, the subject matter disclosed herein provides a high data bandwidth for depthwise convolution operations by modifying existing NPU cores by inverting (or switching) data paths of activations and weights so that a weight-buffer that is internal to a NPU core stores and transmits (or broadcasts) activations, while activation buffer stores and transmits weights. To match weight and activation pairs, 2-to-1 multiplexers are added for every 2/9 multipliers and the core is operated using a RS×HW dataflow to maximize a locality of feature maps to provide a high data bandwidth for depthwise convolutions.

Utilization of NPUs configured for a normal convolution operation is about 3.3% for a depthwise convolution operation having a stride of 1. Using a RS×HW dataflow may improve NPU utilization to about 28% for a 3×3 depthwise convolution having a stride of 1, which is about a nine (9) times utilization increase. For a stride of 2, the utilization improvement may be about a two (2) times improvement. For a 5×5 DW having a stride of 1, utilization may be improved to be about 78%, which is about a 25 times utilization improvement. For a 5×5 DW having a stride of 2, the utilization improvement may be about a six (6) times improvement over conventionally configured NPUs.

In another embodiment, the subject matter disclosed herein provides an implementation for a depthwise convolution operation for a NPU core that improves NPU utilization over that of a NPU core configured for a normal convolution operation. Activation data bandwidth may be improved by 60%-80% by adding 2-to-1 MUXs to the activation data path for ~22% of the NPUs in a 32×32 NPU core and by using adder trees to provide spatial locality for the activation data, which increases NPU utilization for depthwise convolutions by ~9-25 times depending on weight kernel size. The added MUXs may be used to route activations that have been loaded in the WBUF to maximize spatial feature map locality. The added MUXs also reduce an activation data bandwidth requirement for a depthwise convolution operation as compared to the bandwidth needed for a depthwise convolution operation performed on a NPU core that has been configured for a normal convolution operation.

The subject matter disclosed herein provides logical mapping of a depthwise convolution that maximizes the spatial feature-map (activation) locality using adder trees, which reduces an overall activation data bandwidth; and physical mapping of a depthwise convolution by using 2 (2-to-1) multiplexers per 9 multiply units added to a baseline NPU core architecture of 32 rows (C)*32 columns (K)*4 cells (HW).

A depthwise convolution operation performed using NPUs that have been conventionally configured to utilize spatial parallelism for the C and K axes has a utilization of about 3% in, for example, a 32×32 multiplier (MULT) array because a depthwise convolution does not reduce products in an input channel direction. Input channels of a convolutional operation are mapped to the rows of a NPU core and output channels are mapped to the columns of the NPU core, whereas a depthwise convolution only utilizes the multiply-accumulate (MAC) units along the main diagonal within the NPU core, as depicted in FIG. 1.

FIG. 1 depicts an array of multipliers in an example NPU core 100 that has been conventionally configured for normal convolution operations. The NPU core 100 may be referred to as a Conv Core. In FIG. 1, each square 101 represents a multiplier (MULT) unit within a NPU core The gray squares 102 are the only MULT units that are utilized for a depthwise convolution, which results in a MULT utilization ratio of 1/Rows=1/Columns (if Rows=Columns). In a specific NPU core configuration having 32 rows and 32 columns, the utilization is only ~3%.

FIG. 2A depicts a block diagram of a NPU 200 that has been configured for a conventional convolution operation. Activation data (input feature map (IFM) data) and weight data may be initially stored in a memory 201, which may be Static Random Access Memory (SRAM)). During a convolution operation, activation data is transmitted to an activation buffer (ABUF) 202, and weight data may be transmitted to a weight buffer WBUF 203. The activation data and weight data are then transmitted, or sent, to a processing entity (PE) 201 that includes multipliers for processing. The various functional units of the NPU 200 may be embodied as circuits and/or as modules.

A modification the conventional NPU 200 to improve activation bandwidth for depthwise convolution operations is to switch the data paths for activations and for weights. That is, the weight buffer stores and transmits activations, and the activation buffer stores and transmits (or broadcasts) weights. FIG. 2B depicts a modified NPU 200' that improves activation bandwidth for depthwise convolution operations as compared to the activation bandwidth provided by the NPU 200 in FIG. 2A. Activation data and weight data may be initially stored in a memory 201'. During a depthwise convolution operation, activation data is transmitted to an activation buffer (ABUF) 202', and weight data may be transmitted to a weight buffer WBUF 203'. The activation data may then be sent and weight data may be broadcast to a processing entity (PE) 201 that includes multipliers for processing. The various functional units of the NPU 200' may be embodied as circuits and/or as modules.

FIG. 3A depicts a characteristic of a depthwise convolution operation performed by a conventional NPU having data paths switched for activations and for weights (like NPU 200' in FIG. 2B). As a weight kernel (filter) is applied to activation data, the weight kernel is shifted over the activation data along a zig-zag path to provide a spatial feature map locality. Spatial feature map locality is the ratio of feature map pixels that are reused both in time and space. The zig-zag path may be considered to be providing a temporal locality in that some of the activation data is reused for each stride.

During a first cycle0 in FIG. 3A, a 3×3 example weight kernel 301 is applied to nine example activation pixels (values) 302 that are encompassed by (or overlapped by) the 3×3 weight kernel. For a next cycle1, the 3×3 kernel is shifted horizontally to the right by a stride of 1. (Other horizontal strides are possible.) The 3×3 weight kernel is then applied to the nine encompassed activation values. For a cycle2, the 3×3 kernel is again shifted horizontally to the right by a stride of 1, and applied to the nine encompassed activation values, and so on. When the kernel 301 reaches the end of the IFM 302 in the horizontal direction, the kernel is shifted downward by a stride of 1, and processing continues back the other direction, as depicted by the zig-zag path of arrows in FIG. 3A. (Other strides are possible).

Figure 3B:
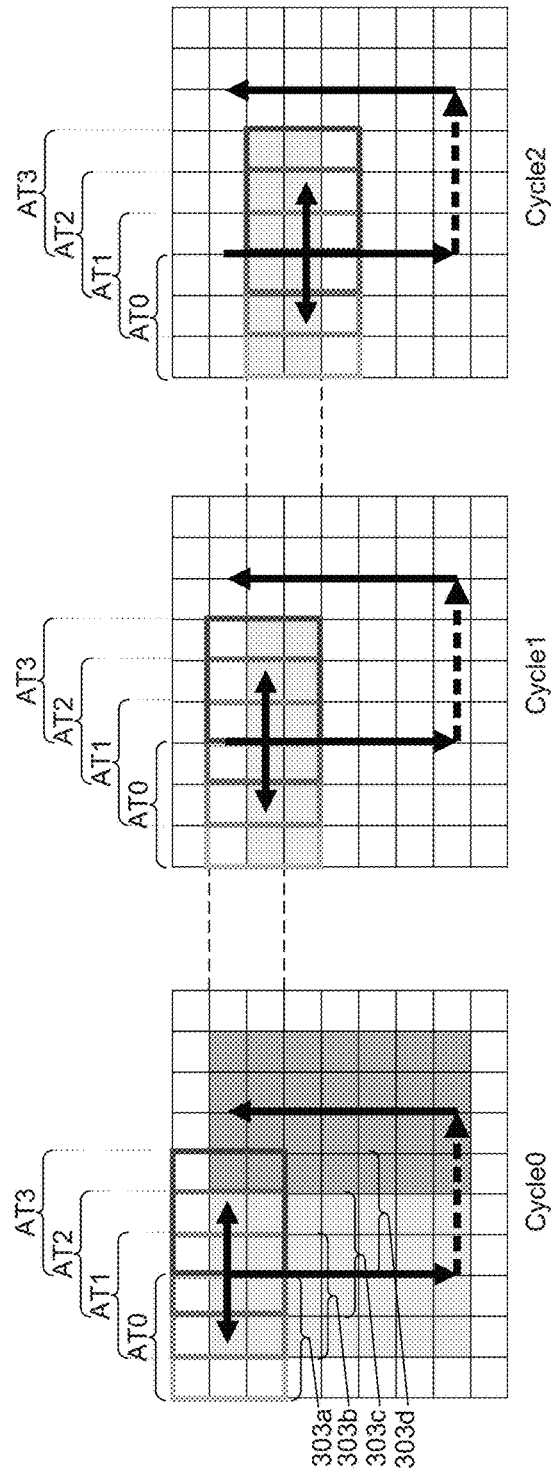
FIG. 3B depicts a characteristic of a depthwise convolution operation performed by a NPU having data paths switched for activations and for weights, and has been modified and uses a RS×HW-based dataflow according to the subject matter disclosed herein.

In contrast to FIG. 3A, FIG. 3B depicts a characteristic of a depthwise convolution operation performed by a NPU having data paths switched for activations and for weights (similar to NPU 200' in FIG. 2B), but has been modified as disclosed herein and uses a RS×HW-based data flow. While the conventional approach depicted in FIG. 3A provides a spatial feature map and temporal locality based on an overlap of input (activation) pixels in a current cycle and a next cycle, the subject matter disclosed herein maximizes feature map locality by utilizing adder-tree (AT) locality along with temporal locality. Adder-tree locality enables an additional overlap of the input pixels (activations) by sharing input pixels among different adder trees (i.e., spatial reuse of input pixels).

In FIG. 3B, four adder trees AT0-AT3 partially share activations for a 3×3 depthwise-convolution. During a cycle0, the nine activation pixels (values) indicated below the AT0 identifier that are encompassed by a 3×3 weight kernel 303a are reduced by a first adder tree AT0. The nine activation values indicated below the AT1 identifier that are encompassed by the 3×3 weight kernel 303b are reduced by a second adder tree AT1. The nine activation values indicated below the AT2 identifier that are encompassed by the 3×3 weight kernel 303c are reduced by a third adder tree AT2. Lastly, the nine activation values indicated below the AT3 identifier that are encompassed by the 3×3 weight kernel 303d are reduced by a fourth adder tree AT4.

For a next cycle1, the weight kernels 303a-303d are shifted down one row of activation values (a stride of 1), and the weight kernels are applied to the activation values similar to the way the weight kernels were applied to the activation values in cycle0. For a cycle 2, the weight kernels 303a-303d are again shifted down one row of activation values (a stride of 1), and the weight kernels are applied to the activation values similar to the way the weight kernels were applied to the activation values in cycle0. Other strides are possible. At the bottom of an activation value map, the kernel is shifted horizontally by the width of the kernel, and the process repeats upwardly with a stride of 1, and so on.

Reuse (partial sharing) of activation data may be pictured by considering the dashed lines between cycle0 and cycle1, and between cycle1 and cycle2. For a 3×3 filter, the bottom two rows of activation data processed in cycle( ) are reused as the top two rows of activation data in cycle1. For cycle2, the bottom two rows of activation data processed in cycle1 are reused as the top two rows of activation data in cycle2. Partial sharing of activation values provided by the process depicted in FIG. 3B may provide a 50% activation bandwidth saving. For a larger number of adder trees (e.g., 32 adder trees in NPU cores having 32 columns), activation bandwidth may be saved by about 65% for a 3×3 weight kernel and about 80% for a 5×5 weight kernel.

Figure 4A:
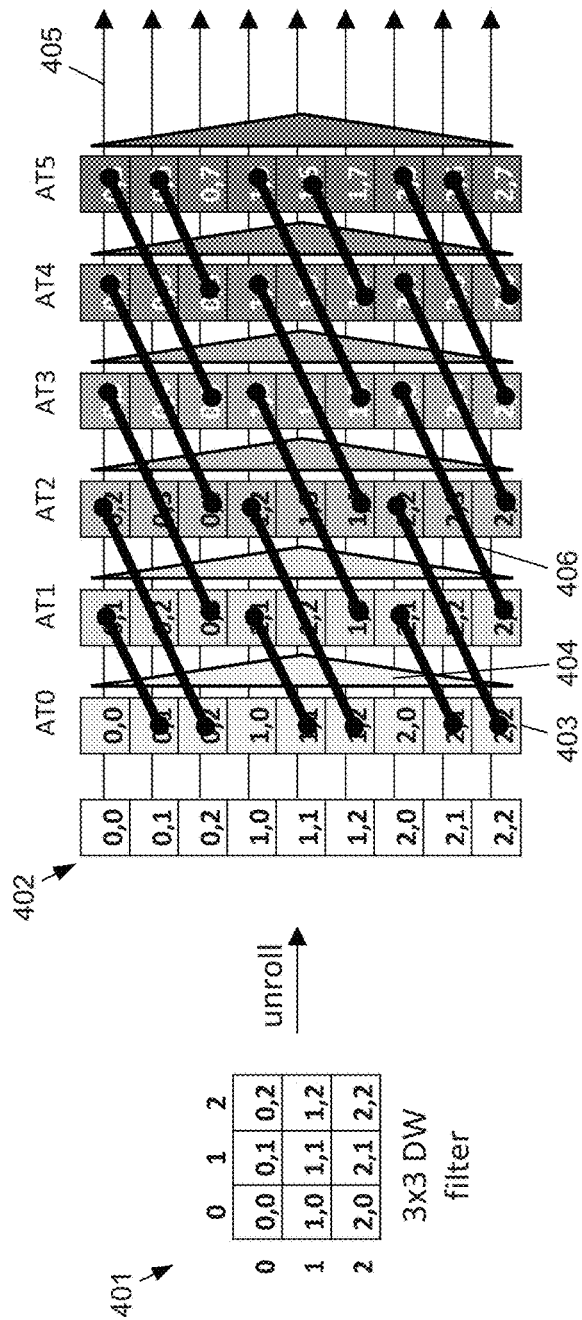
FIG. 4A shows a logical mapping of how weights are broadcast to the multipliers for a single example cycle to maximize spatial feature map locality according to the subject matter disclosed herein.

FIG. 4A shows a logical mapping of how a 3×3 filter of weights a with a stride of 1 is broadcast to the multipliers for a single example cycle to maximize spatial feature map locality according to the subject matter disclosed herein. In FIG. 4A, a 3×3 DW filter is shown at 401. In FIG. 4A (and throughout this disclosure), weight values are indicated by a row and a column location of the weight value in the filter. For example, the weight value at row 0, column 0 is indicated as 0,0. The DW filter 401 is unrolled from a 3×3 configuration to be a 9×1 weight vector 402 in a WBUF (such as WBUF 203' in FIG. 2B). An array of multipliers are arranged in rows and columns, and are represented in FIG. 4A as an array of squares 403, of which only one multiplier is indicated. Although only six columns of multipliers 403 are shown, it should be understood that more or fewer columns of multipliers may be used. Each column of multipliers has a corresponding adder tree (AT) 404, of which only one adder tree is indicated.

Each respective weight is broadcast along a corresponding row, as indicated at 405. Activation values are allocated to each respective multiplier 403. Neighboring multipliers 403 located along a diagonal line 406 (of which only one diagonal line is indicated) use the same activation value. That is, each activation value may be reused by different multipliers 403 and adder trees 404. The diagonal mapping of activation values to weight values maximizes spatial feature map locality according to the subject matter disclosed herein. The maximum AT locality is 2/3 for a 3×3 filter.

Figure 4B:
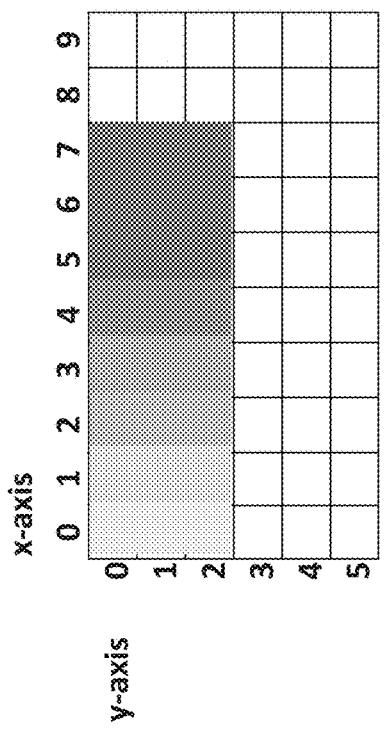
FIG. 4B depicts how an example 3×3 filter is applied to a map of activation values arranged in rows and columns.

FIG. 4B depicts how an example 3×3 filter is applied to a map of activation (IFM) values arranged in rows and columns. Activation values are indicated by row and column locations in the IFM map. The darkening of the shades of gray from left to right corresponds to the darkening of the gray shading of the multipliers 403 and adder trees 404 in FIG. 4A. Although only six rows and ten columns of an activation value map are depicted in FIG. 4B, it should be understood that activation value maps may include more or fewer rows and/or columns.

Figure 5A:
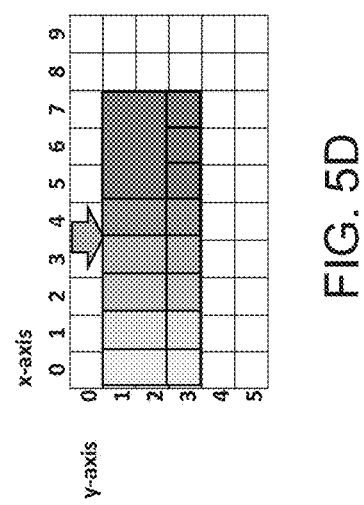
FIGS. 5A and 5B respectively depict a logical mapping of weights and activations allocated in a first cycle of multiple cycles according to the subject matter disclosed herein.
Figure 5B:
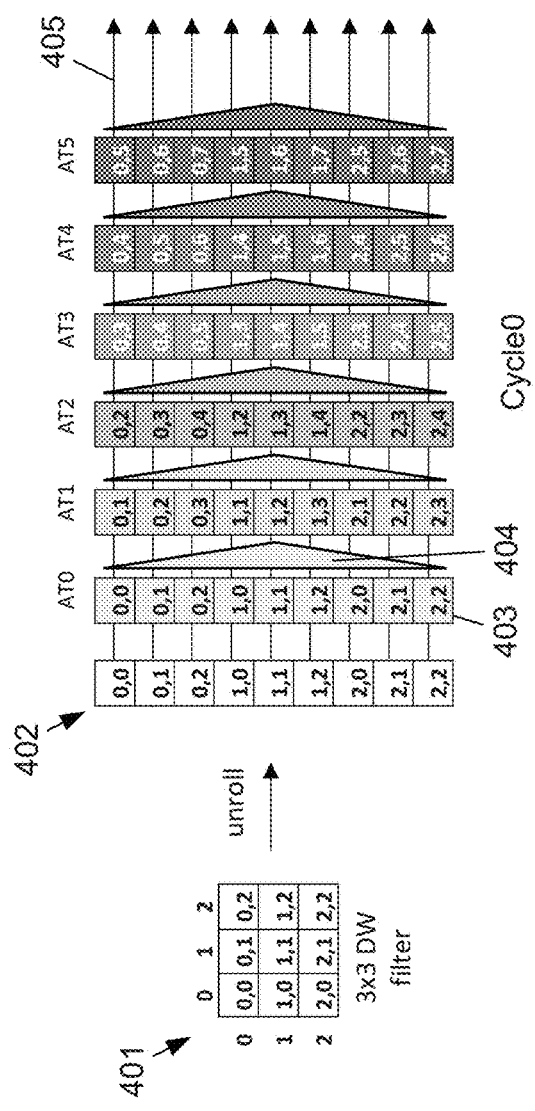
Figure 5C:
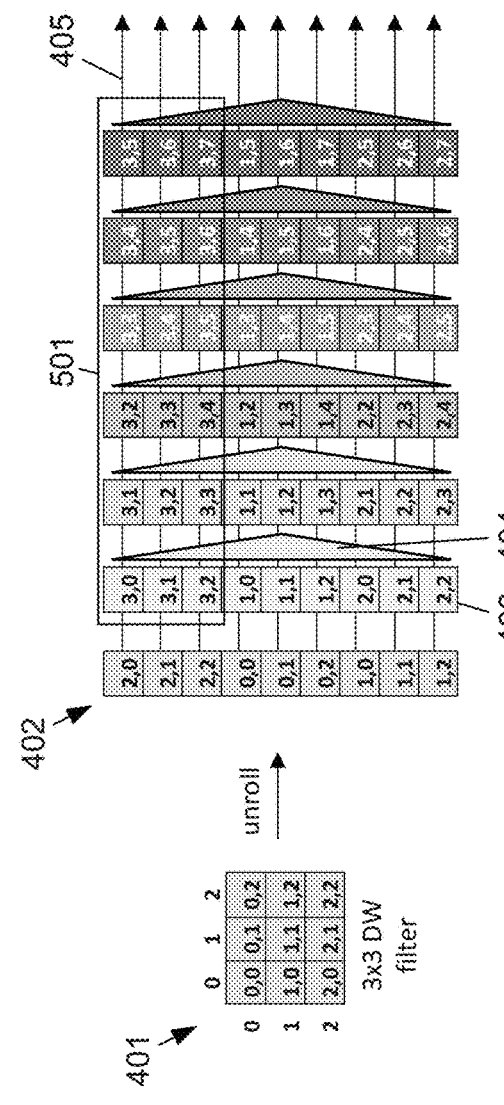
FIGS. 5C and 5D respectively depict a logical mapping of weights and activations allocated in a next cycle of multiple cycles according to the subject matter disclosed herein.
Figure 5D:

FIGS. 5A and 5B respectively depict a logical mapping of weights and activations allocated in multiple cycles according to the subject matter disclosed herein. FIG. 5A shows the logical mapping of the weights of a 3×3 filter for a cycle0 (and is similar to FIG. 4A). FIG. 5B is identical to FIG. 4B. For a next cycle1, shown in FIG. 5C, the weight kernel has shifted downward with a stride of 1. FIG. 5D depicts the example 3×3 filter being shifted downward with respect to the activation values. Weight values are rotated so that the top three rows now become the bottom three rows of the 9×1 vector, which causes the other six weight values to rotate up. As the weight kernel shifts downward, new activation values replace the top three rows of activation values as indicated in box 501. Only the first three rows of the activation values are fetched due to temporal feature map locality. A logical mapping of the weights to multipliers 503 is a diagonal mapping (diagonal lines not shown), and is the same as the diagonal logical mapping shown in FIG. 4A, but differs only by the activation values being updated for cycle1.

In a next cycle2 (not shown), three rows of activation values will be added to the top three rows of multipliers, while the weight values continue to rotate. This sequence of adding activation values to the top three rows of multipliers and the rotation of the weight values continues as the weight kernel is moved through the activation values by a path depicted by heavy lines in FIG. 3B.

Figure 6A:
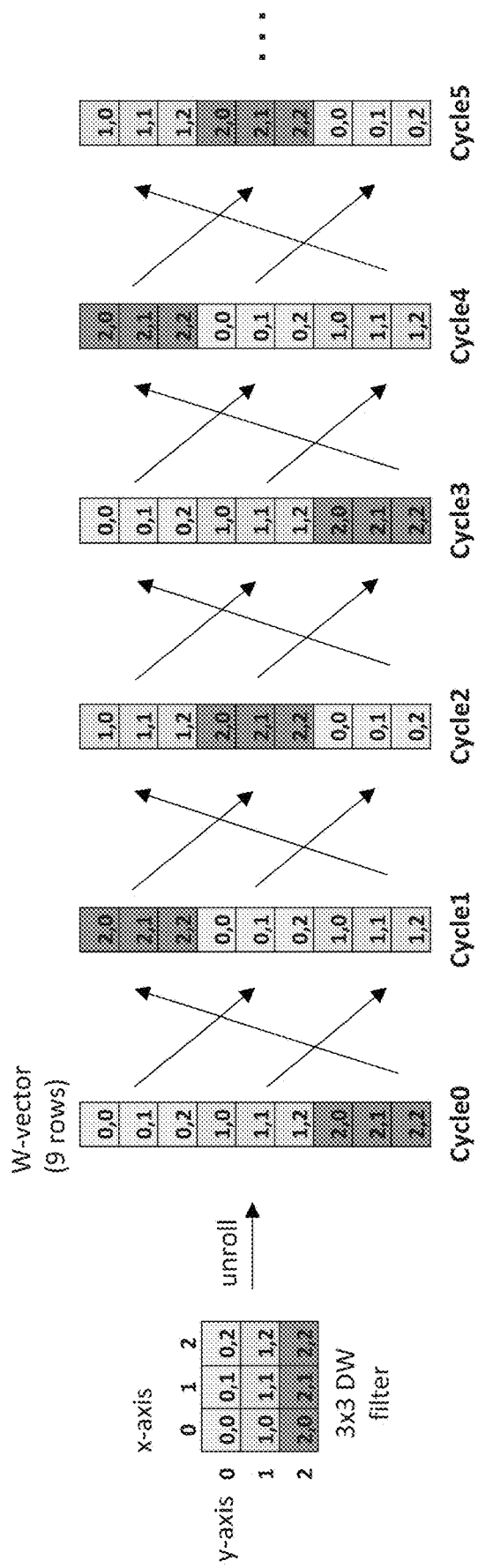
FIG. 6A depicts an example rotating sequence for six example cycles for a 3×3 DW filter according to the subject matter disclosed herein.

FIG. 6A depicts an example rotating sequence for six example cycles for a 3×3 DW filter according to the subject matter disclosed herein. The rows in a 3×3 DW filter are shifted down by three rows at a cycle to match the row indices of activations and weights. To match the location (i.e., rows) of weight values, shuffling logic may be used to reroute the weights to their corresponding rows. Since the rotation of three row-groups generates all possible weight vectors for a filter, there is no need to fetch new weights until the DW convolution for the filter has been completed.

FIG. 6B depicts an example 3×3 filter being shifted downward with respect to the activation values for four cycles according to the subject matter disclosed herein. FIG. 6C depicts how activation values are sent to the multipliers using a four-row activation buffer (ABUF) as a line buffer according to the subject matter disclosed herein. Three rows are used for sending activation values to the core, and one row is refreshed by SRAM. For example, during a cycle0, rows y=0 through y=2 are sent to the core, and row y=3 is updated from the memory (SRAM). During a cycle1, rows y=1 through y=3 are sent to the core, and a row y=4 (located at the top row) is updated from the memory. During a cycle2, rows y=2, 3 and 4 are sent to the core, and a row y=5 is updated from the memory. Activations may be routed to their respective destinations using, for example, a 4×4 crossbar circuit.

FIGS. 7A and 7B conceptually show that the diagonal mapping (FIG. 7A) may be implemented as horizontal mapping (FIG. 7B) by rotating weight values in the weight vector according to the subject matter disclosed herein. Weight values in the 9×1 vector may be rotated as shown at 701 to implement horizontal broadcasting. The "%" in the nomenclature "AT % X" is a modulus operator. For example, "AT %3=1" means that the remainder after dividing the adder trees index (AT) by 3 is 1. AT(1)%3=AT(4)%3=1. The remainder is the number of sliding steps that the weight values rotate. That is, the diagonal mapping of activation values may be implemented as a horizontal sharing of activation values so that weight broadcasting is horizontal. To provide horizontal weight broadcasting and horizontal activation sharing, three multipliers out of four may be used in a baseline NPU core (32×32×4) described in FIGS. 8A and 8B.

Figure 8A:
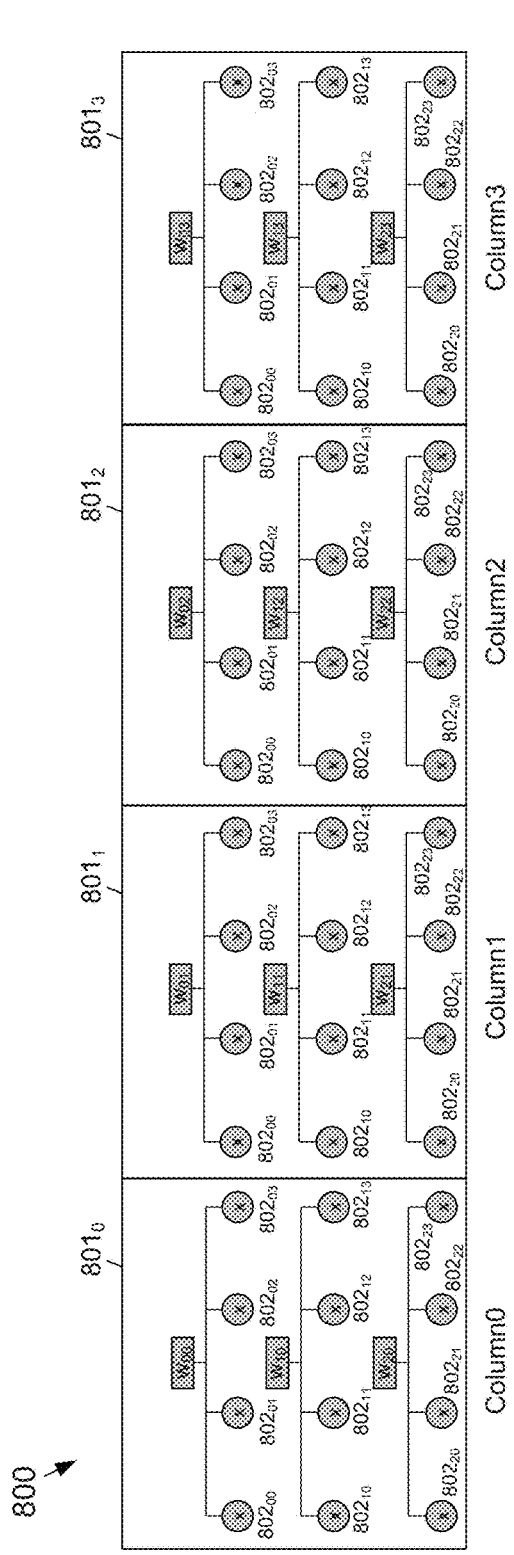
FIG. 8A depicts four filter groups in four columns that are configured as part of a NPU core for a conventional convolution operation.

FIG. 8A depicts four filter groups 801$_0$-801$_3$ in four columns (column0-column3) that are configured as part of a NPU core 800 for a conventional convolution operation. The NPU core 800 may include additional columns of filter groups and additionally filter groups in each column that are not shown. Each filter group 801 includes 3×4 multipliers 802$_{xy}$. In each filter 801, a row of four OFM pixels 802 share a single weight value $w_{xy}$. Each OFM pixel is connected to an independent activation input (not shown) and adder tree (not shown). Activation inputs are shared across columns for a given OFM pixel.

Figure 8B:
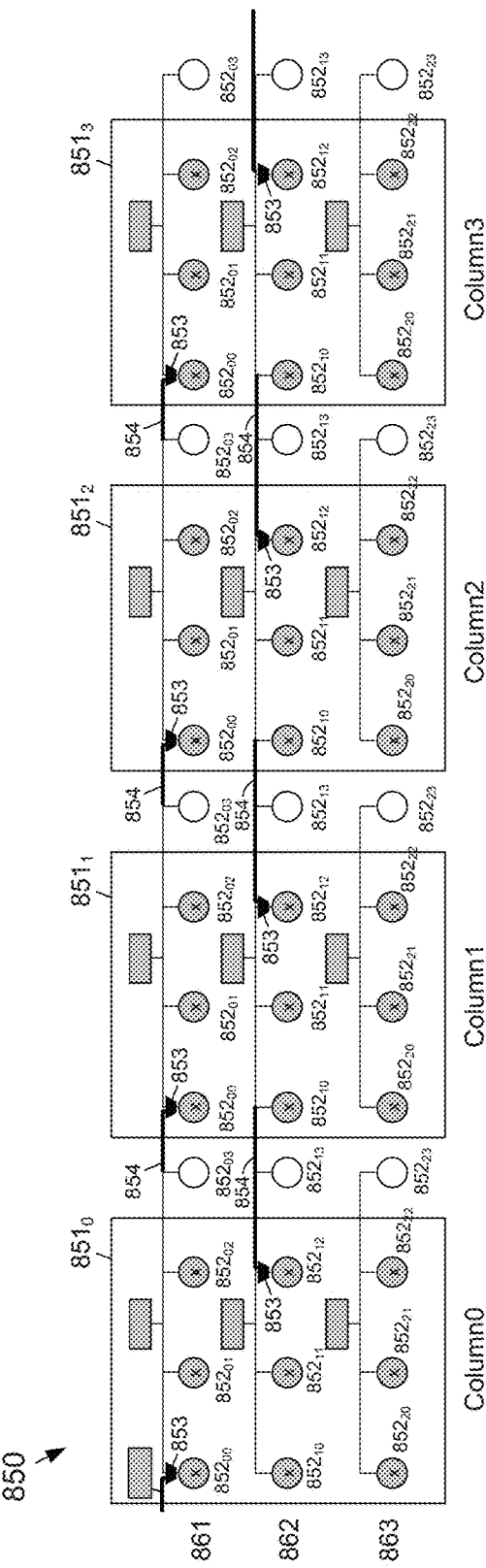
FIG. 8B shows the NPU core of FIG. 8A modified to be an NPU core that maximizes spatial feature map locality according to the subject matter disclosed herein.

FIG. 8B shows the NPU core of FIG. 8A modified to be an NPU core 850 for a depthwise convolution that maximizes spatial feature map locality for a 3×3 filter and a stride of 1 according to the subject matter disclosed herein. In a first row 861 of each pixel 851, a 2-to-1 multiplexer 853 is inserted into the input of the first multiplier 852$_{0,0}$ and a connection 854 is added along the first row 861 between each pixel 851, as shown. In a second row 862 of each pixel 851, a 2-to-1 multiplexer 853 is inserted into the input of the third multiplier 852$_{1,2}$ and a connection 854 is added along the second row 862 between each pixel 851, as shown. In a third row 863 of each pixel 851 is not modified. The fourth multiplier 852$_{x3}$ in each pixel 851 in each row is disabled as indicated by a white circle. Modification of groups of three rows is repeated for all three-row groups to complete the modification the NPU core of FIG. 8A to be the NPU core 850.

Figure 8C:
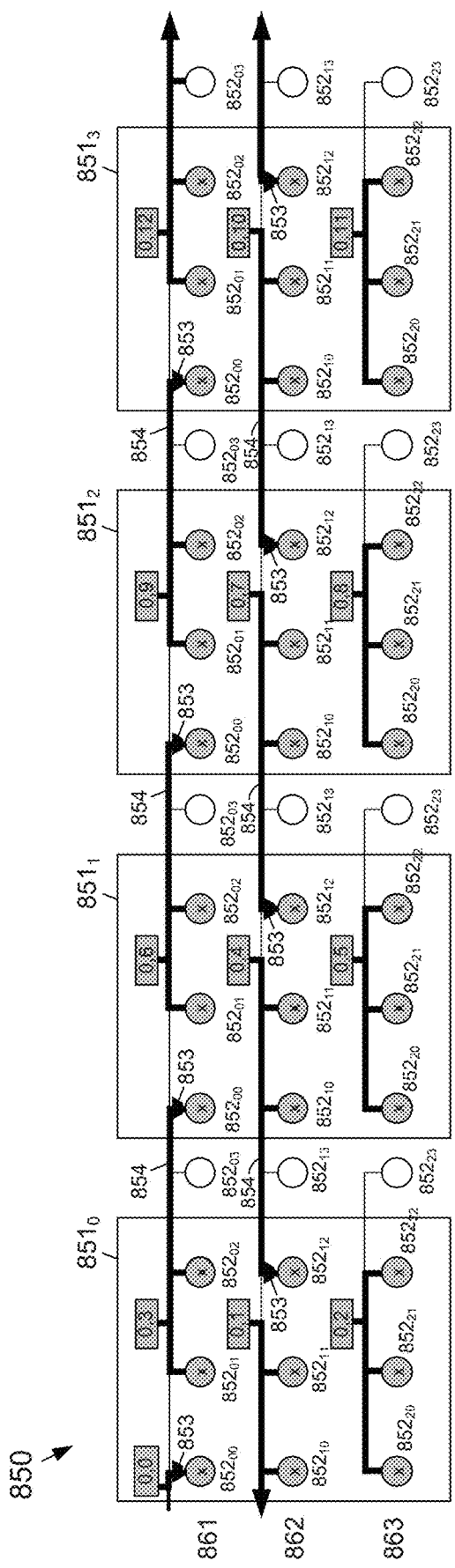
FIG. 8C depicts an example of how activation values are input to the NPU core through an activation buffer according to the subject matter disclosed herein.

FIG. 8C depicts an example of how activation values are input to the NPU core 850 through the ABUF. Example activation values corresponding to the activation values in FIG. 7B are shown being input to the multipliers 851. The heavy lines in FIG. 8C indicate how activation values are shared between the multipliers 851. For example, activation value 0,0 is input to multiplier (and is not shared based on the mapping). Activation value 0,3 is shared between multipliers 852$_{01}$ and 852$_{02}$ in pixel 851$_0$ and multiplier 852$_{00}$ in pixel 851$_1$. Activation value 0,6 is shared between multipliers 852$_{01}$ and 852$_{02}$ in pixel 851$_1$ and multiplier 852$_{00}$ in pixel 851$_2$. Activation value 0,9 is shared between multipliers 852$_{01}$ and 852$_{02}$ in pixel 851$_2$ and multiplier 852$_{00}$ in pixel 851$_3$, and so on.

FIG. 9A shows a logical mapping of how a 3×3 filter of weights with a stride of 2 is broadcast to the multipliers for a single example cycle to maximize spatial feature map locality according to the subject matter disclosed herein. FIG. 9A is identical to FIG. 4A, except that when a stride of 2 is used for the 3×3 DW filter every second column of multipliers and corresponding adder trees do not contribute to the OFM data and may be disabled. Columns of multipliers and corresponding adder trees that may be disabled for a stride of 2 are indicated at 901.

FIG. 9B corresponds to FIG. 9A and indicates columns of multipliers (adders not shown) that may be disabled for a 3×3 filter with a stride of 2. FIG. 9B is identical to FIG. 8C except columns of multipliers that may be disabled for a 3×3 filter with a stride of 2 are indicated at 901.

Figure 10A:
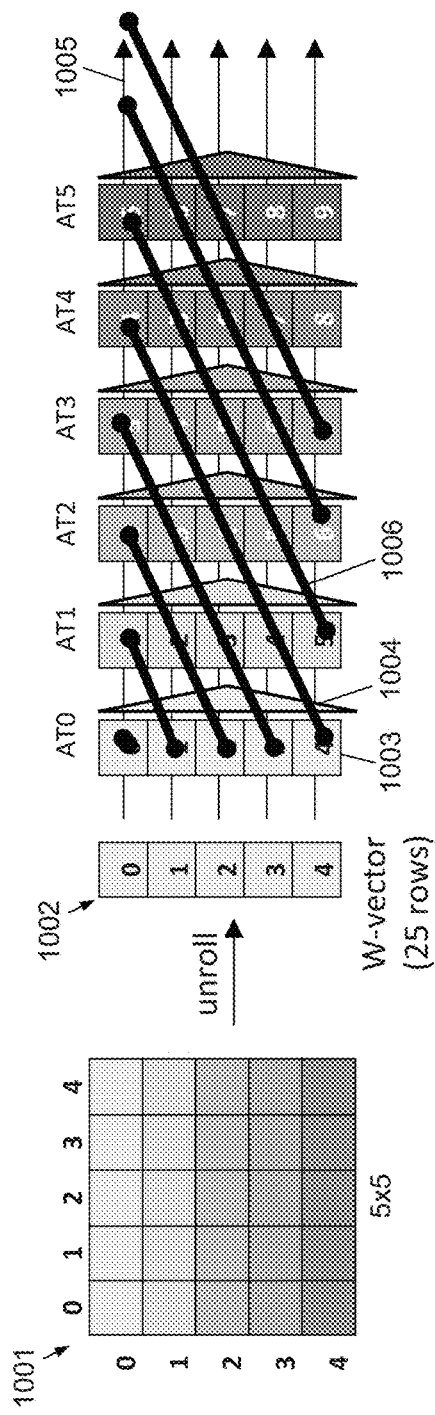
FIG. 10A shows a logical mapping of how a 5×5 filter of weights with a stride of 1 is broadcast to the multipliers for a single example cycle to maximize spatial feature map locality according to the subject matter disclosed herein.

FIG. 10A shows a logical mapping of how a 5×5 filter of weights with a stride of 1 is broadcast to the multipliers for a single example cycle to maximize spatial feature map locality according to the subject matter disclosed herein. When a 5×5 filter is used, five rows work together to represent the horizontal inputs. A single IFM value is shared across five adder trees. In FIG. 10A, a 5×5 DW filter is shown at 1001. The DW filter 1001 is unrolled from a 5×5 configuration to be a 25×1 weight vector 1002 in a WBUF. An array of multipliers are arranged in rows and columns, and are represented in FIG. 10A as an array of squares 1003, of which only one multiplier is indicated. Although only six columns of multipliers 1003 are shown, it should be understood that more or fewer columns of multipliers may be used. Each column of multipliers has a corresponding adder tree (AT) 1004, of which only one adder tree is indicated.

Each respective weight is broadcast along a corresponding row, as indicated at 1005. Activation values are allocated to each respective multiplier 1003. Neighboring multipliers 1003 located along a diagonal line 1006 (of which only one diagonal line is indicated) use the same activation value. The diagonal mapping of activation values to weight values maximizes spatial feature map locality according to the subject matter disclosed herein. The maximum AT locality is 4/5 for a 5×5 filter.

Figure 10B:
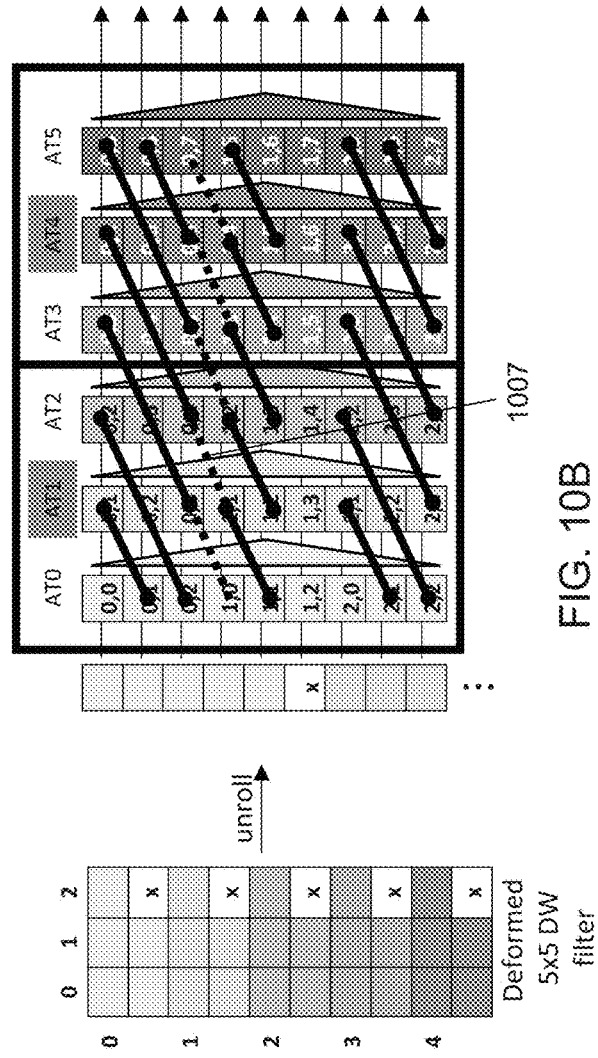
FIG. 10B conceptually shows that the three adder-tree diagonal mapping of activation values of FIG. 7A may be extended to be a five adder-tree diagonal mapping for a 5×5 filter according to the subject matter disclosed herein.

FIG. 10B conceptually shows that the three adder-tree diagonal mapping of activation values of FIG. 7A may be extended to be a five adder-tree diagonal mapping for a 5×5 filter according to the subject matter disclosed herein. To do this, each row of the 5×5 may be conceptually deformed to become a 2×3 filter in which the weight value at 2,3 is not used (indicated by an x). Extended mapping locations are indicated by a heavy dashed line 1007.

Figure 10C:
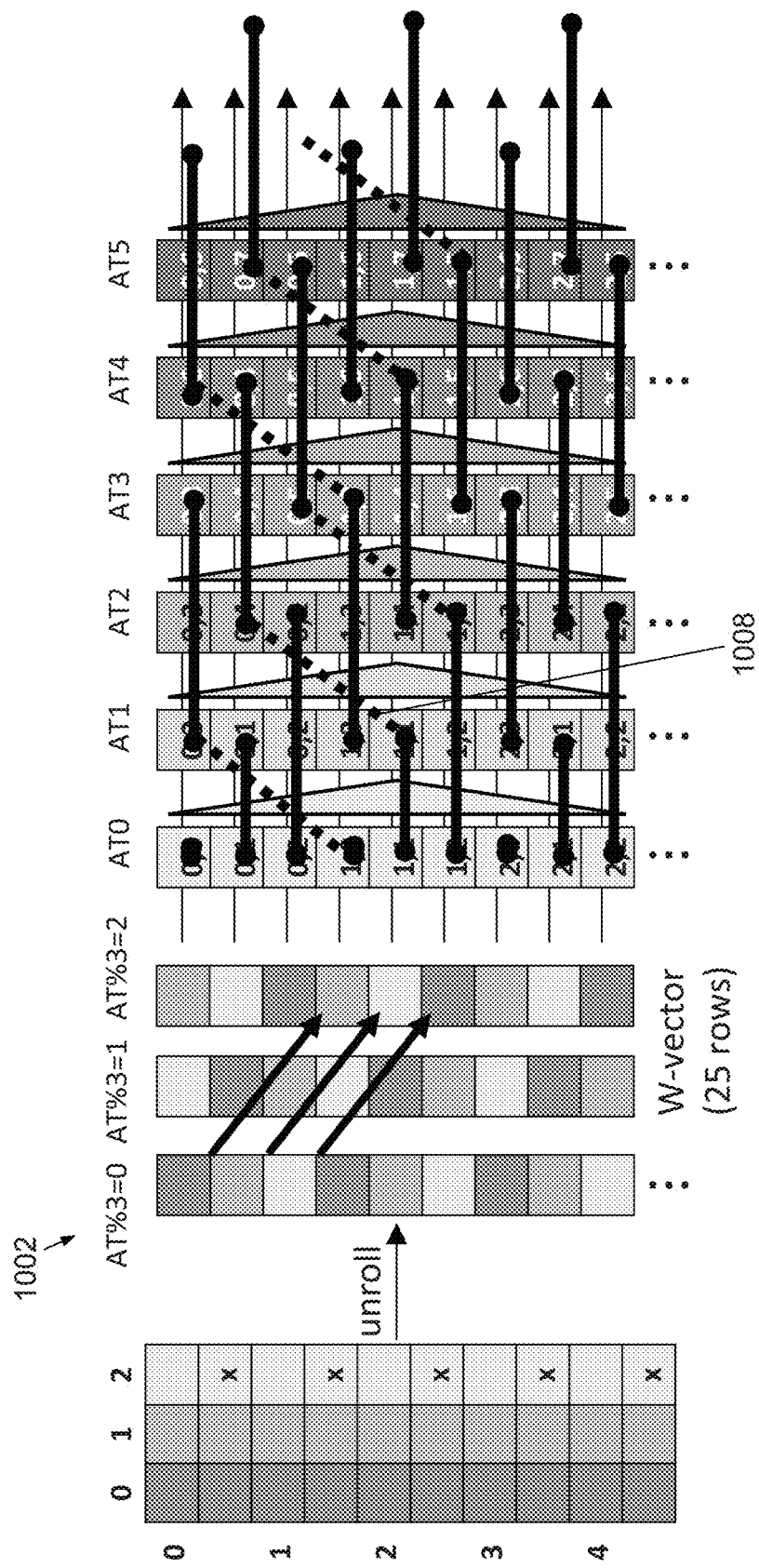
FIG. 10C conceptually shows that the diagonal mapping of activation values in FIGS. 10A and 10B may be implemented as a horizontal sharing of activation values by rotating the weight values of the 5×5 filter so that weight broadcasting is horizontal.

FIG. 10C conceptually shows that the diagonal mapping of activation values in FIGS. 10A and 10B may be implemented as a horizontal sharing of activation values by rotating the weight values of the 5×5 filter so that weight broadcasting is horizontal. The rotation of the weight values is over three rows of the 15×1 weight vector 1002. The heavy dashed lines 1008 provide a sharing of weight values so that activation values are only supplied to three rows out of six row due to spatial reuse of activation values (with one row being idle). To provide horizontal weight broadcasting, every sixth multiplier is disabled (zero activity) in a baseline NPU core (32×32×4).

Figure 11:
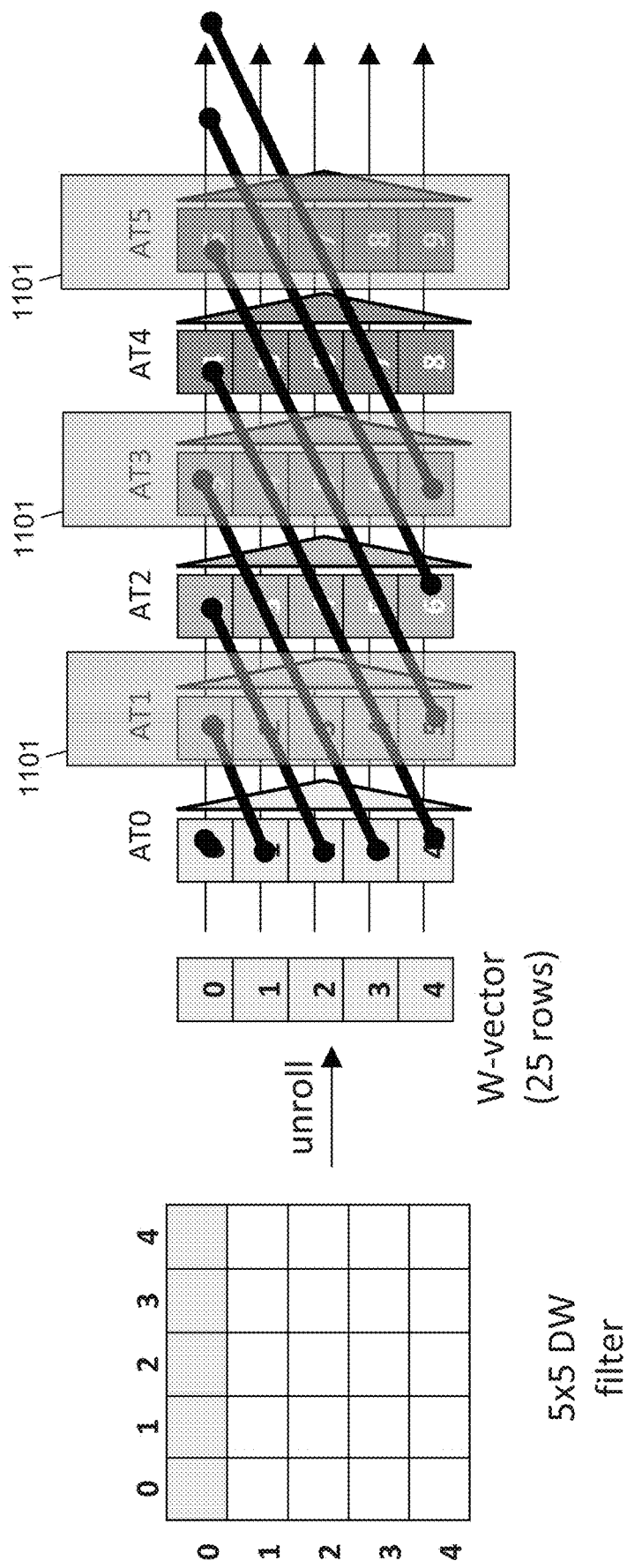
FIG. 11 shows a logical mapping of how a 5×5 filter of weights with a stride of 2 is broadcast to the multipliers for a single example cycle to maximize spatial feature map locality according to the subject matter disclosed herein.

FIG. 11 shows a logical mapping of how a 5×5 filter of weights with a stride of 2 is broadcast to the multipliers for a single example cycle to maximize spatial feature map locality according to the subject matter disclosed herein. Similar to a 3×3 filter with a stride of 2, every other adder tree is disabled, as indicated at 1101.

FIG. 12 depicts an electronic device 1200 that includes a neural processing unit that may be configured for a depthwise convolution that maximizes spatial feature-map locality using adder trees according to the subject matter disclosed herein. The electronic device 1200 may include a controller (or CPU) 1210, an input/output device 1220 such as, but not limited to, a keypad, a keyboard, a display, a touch-screen display, a camera, and/or an image sensor, a memory 1230, an interface 1240, a GPU 1250, an imaging-processing unit 1260, and a neural processing unit 1270 that are coupled to each other through a bus 1280. The controller 1210 may include, for example, at least one microprocessor, at least one digital signal processor, at least one microcontroller, or the like. The memory 1230 may be configured to store a command code to be used by the controller 1210 or a user data. Electronic device 1200 and the various system components of electronic device 1200 may be formed by one or more modules.

In one embodiment, the neural processing unit 1270 may be configured to maximize spatial feature-map locality using adder trees according to the subject matter disclosed herein. The interface 1240 may be configured to include a wireless interface that is configured to transmit data to or receive data from a wireless communication network using a RF signal. The wireless interface 1240 may include, for example, an antenna. The electronic system 1200 also may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service-Time Division Duplex (UMTS-TDD), High Speed Packet Access (HSPA), Evolution Data Optimized (EVDO), Long Term Evolution-Advanced (LTE-Advanced), Multichannel Multipoint Distribution Service (MMDS), Fifth-Generation Wireless (5G), Sixth-Generation Wireless (6G), and so forth.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A core of neural processing units (NPUs), comprising:
a first memory that stores first values;
a second memory that stores second values; and
an array of NPUs arranged in C rows and K columns in which C and K comprise integers that are both divisible by 4, each NPU comprising 4×4 processing elements (PEs) arranged in 4 rows and 4 columns, each PE comprising a first input and a second input,
in a first operational mode of the core of NPUs, the core of NPUs being configured as Int (C/3) row groups (RGs), each row group comprising:
three consecutively adjacent rows of PEs,
a first row RG1 comprising one or more 2 to 1 multiplexers having an output coupled to the first input of a PE11 designating the first row and a first column in each kth NPU for k=1 to K, the one or more 2 to 1 multiplexers comprising a first input and a second input,
for k=1, the first input to the one or more 2 to 1 multiplexers being coupled to the first memory,
for k=1 to K, the first input of each PE12 designating the first row and a second column and the first input of each PE14 designating the first row and a fourth column in each kth NPU being coupled to the second input of the one or more 2 to 1 multiplexers coupled to the PE11 in the kth NPU, to the first input of the one or more 2 to 1 multiplexers that is coupled to the PE11 in a (k+1)th NPU, and to the first memory, a second row RG2 comprising a 2 to 1 multiplexer having an output coupled to the first input of a PE23 designating the second row and a third column in each kth NPU for k=1 to K, for k=1, the first input of a PE21 designating the second row and the first column and a PE22 designating the second row and the second column in the kth NPU being coupled to the first input of the 2 to 1 multiplexer coupled to the PE23 in the kth NPU and to the first memory, for k=2 to K, the first input of the PE21 and the PE22 in each kth NPU being coupled to the second input of the 2 to 1 multiplexer coupled to the PE23 in the (k 1)th NPU, to the first input of a PE24 designating the second row and the fourth column in the (k 1)th NPU, to the first input of the 2 to 1 multiplexer coupled to the PE23 in the kth NiPU, and to the first memory, a third row RG3 comprising the first input of each of a PE31 through a PE34, wherein the PE31 designates a third row and the first column, and the PE34 designates the third row and the fourth column, the first input of each of the PE31 through the PE34 being coupled to the first input of each other PE31 through PE34 of the kth NPU, and to the first memory, wherein k=1 to K, and the second input of each PE in a column of PEs being coupled to the second memory.

2. The core of NPUs of claim 1, wherein PE14, PE24, PE34 and PE44 of each NPU are disabled in the first operational mode.

3. The core of NPU of claim 2, wherein for k=odd, PE12, PE22, PE32 and PE42 of each row of NPUs is disabled, and for k=even, PE11, PE12, PE13, PE14, PE13, PE23, PE33 and PE43 of each row of NPUs is disabled in the first operating mode.

4. The core of NPUs of claim 3, wherein the second values stored in the second memory comprise values for a 5×5 filter.

5. The core of NPUs of claim 1, wherein in a second operational mode the core of NPUs being configured as:

for k=1 to K, each row of PEs being coupled to the first memory; and the second input of each PE in a column of PEs being coupled to the second memory.

6. The core of NPUs of claim 5, wherein the core of NPUs generates a convolution result from the first values and the second values in the second operational mode.

7. The core of NPUs of claim 1, wherein the core of NPUs generates a depthwise convolution result from the first values and the second values in the first operational mode.

8. The core of NPUs of claim 1, wherein the first memory stores activation values and the second memory stores weight values.

9. The core of NPUs of claim 1, wherein the second values stored in the second memory comprise values for a 3×3 filter.

10. A method to configure a core of neural processing units (NPUs), the core of NPUs comprising an array of NPUs arranged in C rows and K columns in which C and K comprise integers that are both divisible by 4, each NPU comprising 4×4 processing elements (PEs) arranged in 4 rows and 4 columns, each PE comprising a first input and a second input, the method comprising:

for a first operational mode, configuring the core of NPUs to generate a depthwise convolution result from first values and second values by configuring the core of NPUs into Int (C/3) row groups (RGs), each row group comprising three consecutively adjacent rows of PEs;

configuring a first row RG1 so that one or more 2 to 1 multiplexers has an output coupled to the first input of a PE11 designating the first row and a first column in each kth NPU for k=1 to K, the one or more 2 to 1 multiplexers comprising a first input and a second input, for k=1, configuring the first input to the one or more 2 to 1 multiplexers to be coupled to a first memory that stores the first values, and for k=1 to K, configuring the first input of each PE12 designating the first row and a second column and each PE14 designating the first row and a fourth column in each kth NPU to be coupled to the second input of the one or more 2 to 1 multiplexers that is coupled to the PE11 in the kth NPU, to be coupled to the first input of the one or more 2 to 1 multiplexers coupled to the PE11 in a (k+1)th NPU, and to be coupled to the first memory;

configuring a second row RG2 so that a 2 to 1 multiplexer has an output coupled to the first input of a PE23 designating the second row and a third column in each kth NPU for k=1 to K, for k=1, configuring the first input of a PE21 designating the second row and the first column and the first input of a PE22 designating the second row and the second column in the kth NPU to be coupled to the first input of the 2 to 1 multiplexer coupled to the PE23 in the kth NPU and to be coupled to the first memory, for k=2 to K, configuring the first input of the PE21 and the PE22 in each kth NPU to be coupled to the second input of the 2 to 1 multiplexer coupled to the PE23 in the (k)th NPU, to be coupled to the first input of a PE24 designating the second row and the fourth column in the (k)th NPU, to be coupled to the first input of the 2 to 1 multiplexer coupled to the PE23 in the kth NPU, and to be coupled to the first memory, configuring a third row RG3 so that the first input of each of a PE31 through a PE34, the PE31 designating a third row and the first column, and the PE34 designating the third row and a fourth column, is coupled to the first input of each other PE31 through PE34 of the kth NPU, and is coupled to the first memory, wherein k=1 to K, and configuring the second input of each PE in a column of PEs to be coupled to a second memory that stores the second values.

11. The method of claim 10, further comprising configuring PE14, PE24, PE34 and PE44 of each NPU to be disabled in the first operational mode.

12. The method of claim 11, further comprising for k=odd, configuring PE12, PE22, PE32 and PE42 of each row of NPUs to be disabled, and for k=even, configuring PE11, PE12, PE13, PE14, PE13, PE23, PE33 and PE43 of each row of NPUs to be disabled in the first operating mode.

13. The method claim 12, wherein the second values stored in the second memory comprise values for a 5×5 filter.

14. The method of claim 10, further comprising configuring the core of NPUs in a second operational mode by:

for k=1 to K, configuring each row of PEs to be coupled to the first memory; and configuring the second input of each PE in a column of PEs to be coupled to the second memory.

15. The method of claim 14, further comprising generating by the core of NPUs a convolution result from the first values and the second values in the second operational mode.

16. The method of claim 10, further comprising generating by the core of NPUs a depthwise convolution result from the first values and the second values in the first operational mode.

17. The method of claim 10, wherein the first memory stores activation values and the second memory stores weight values.

18. The method of claim 10, wherein the second values stored in the second memory comprise values for a 3×3 filter.

* * * * *